United States Patent
Watanabe et al.

(10) Patent No.: US 8,294,402 B2
(45) Date of Patent: Oct. 23, 2012

(54) BRIDGE RECTIFIER CIRCUIT

(75) Inventors: Tetsushi Watanabe, Tokyo (JP); Masaaki Taruya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 340 days.

(21) Appl. No.: 12/649,571

(22) Filed: Dec. 30, 2009

(65) Prior Publication Data
US 2010/0301791 A1 Dec. 2, 2010

(30) Foreign Application Priority Data
Jun. 2, 2009 (JP) ................................. 2009-133074

(51) Int. Cl.
*H02P 6/18* (2006.01)
(52) U.S. Cl. ......... 318/400.35; 318/400.34; 318/400.32; 318/400.01; 318/700
(58) Field of Classification Search ............. 318/400.35, 318/400.34, 400.01, 700
See application file for complete search history.

(56) References Cited

U.S. PATENT DOCUMENTS

| 7,612,542 B2 * | 11/2009 | Eguchi et al. | 323/222 |
| 7,777,433 B2 * | 8/2010 | Yamaguchi et al. | 318/139 |
| 2002/0195286 A1 * | 12/2002 | Shirakawa et al. | 180/65.1 |

FOREIGN PATENT DOCUMENTS

| JP | 04-138030 A | 5/1992 |
| JP | 2002-204534 A | 7/2002 |

OTHER PUBLICATIONS

Japanese Office Action corresponding to Japanese Patent Application No. 2009-133074 dated Mar. 8, 2011.

* cited by examiner

*Primary Examiner* — Walter Benson
*Assistant Examiner* — David Luo
(74) *Attorney, Agent, or Firm* — Sughrue Mion, PLLC

(57) ABSTRACT

A bridge rectifier circuit, which takes control of a current flowing through an armature winding of a motor-generator and a battery, includes rectifier elements each made of a MOSFET; phase current detection means that detect the amount and the direction of current flowing between the drain and the source of the FET; and a control means that takes on/off control of the FET by applying a control voltage between the gate and the source thereof; wherein when the phase current detection means detect a reverse current flowing through the FET exceeding a first predetermined value, the control means applies a control voltage between the gate and the source of the FET so as to turn on the FET.

2 Claims, 2 Drawing Sheets

BRIDGE RECTIFIER CIRCUIT

BACKGROUND OF THE INVENTION

1. Field of the Invention

The present invention relates to a bridge rectifier circuit used in a synchronous generator or a synchronous motor-generator, having an armature and a field winding, that is mostly mounted on a vehicle and serves as a starter-motor when starting the combustion engine as well as a generator after the engine start.

2. Description of the Related Art

In a synchronous generator or a synchronous motor-generator that has an armature and a field winding and serves as a starter-motor when starting the combustion engine as well as a generator after the engine start, to date, technologies have been disclosed in, for example, Japanese Patent Publication No. 2959640 (hereinafter referred to as Patent Document 1), in which power loss during generating and charging operations can be reduced using, as rectifier elements for the rectifier circuit, metal-oxide semiconductor field-effect transistors (hereinafter referred to as MOSFET or FET). The technology disclosed in Patent Document 1 is as follows: when a voltage is applied between the drain and the source of an FET in such a way that voltage at the source is higher than that at the drain (when a reverse voltage is applied therebetween), a voltage is applied between the gate and the source thereof so that the FET is turned on, thereby reducing power loss.

However, in such a conventional technology as disclosed in Patent Document 1, when a voltage generated by the armature winding is outputted through the bridge rectifier circuit to a battery for its charging, or a current thereby is supplied to the battery, determination as to whether voltage at the source of the FET is higher than that at the drain thereof (that is, whether a reverse voltage is applied therebetween) is made based on a difference in voltage across the two terminals of the FET. Therefore, in determining the voltage difference, a determination threshold for the reverse voltage needs to be set within a range of a forward voltage drop (around 1V to 1.5V) of a parasitic diode formed in the opposite direction of the drain to the source so that the FET is not erroneously turned on, taking also into account temperature dependence in which voltage drop between the drain and the source varies with temperature. Therefore, the range of the determination voltage must be severely limited, resulting in deterioration of detectability, which has in turn caused a problem in that an operation area in which power loss in the bridge rectifier circuit can be reduced by taking control of turning on the FET must also be limited.

Moreover, there has been another problem in that protections and the like against abnormal high-current failures due to short-circuit of FETs connected in series in the bridge rectifier circuit or abnormal currents when the motor-generator is operating as the motor at the engine start are also restricted.

Furthermore, in a case of using a method in which, when voltage at the source is higher than that at the drain (when a reverse voltage is applied therebetween), a voltage is applied between the gate and the source so that the FET is turned on to reduce power loss, if a failure in which voltage at the source becomes higher than that at the drain occurs due to a power-source short-circuit failure causing the battery voltage to be applied to FET output terminals or due to other abnormalities and failures, the FET is controlled to turn on despite the presence/absence of a voltage generated by the armature winding, which resultantly raises a fear in that failures can not be properly detected so that an overcurrent might flow through the bridge rectifier circuit, getting the circuit into a serious failure state such as burnout.

SUMMARY OF THE INVENTION

The present invention is made to resolve problems as described above, and aims at providing a bridge rectifier circuit that enables, in a vehicle powered by an internal-combustion engine, power loss during generating and charging operations to be reduced as well as enables protections against abnormal high currents.

A bridge rectifier circuit according to the present invention, which is electrically connected between a battery and a motor-generator having an armature winding and takes control of a current flowing through the armature winding and the battery, includes rectifier elements for the bridge rectifier circuit, each made of a MOSFET; phase current detection means that detect the amount and the direction of current flowing between the drain and the source of the FET; and a control means that takes on/off control of the FET by applying a control voltage between the gate and the source thereof; wherein if the phase current detection means detect a reverse current flowing through the FET exceeding a first predetermined value, the control means applies a control voltage between the gate and the source of the FET so as to turn on the FET.

Meanwhile, if the phase current detection means detect a forward current flowing through the FET exceeding a second predetermined value, the control means stops the control voltage being applied between the gate and the source of the FET to turn off the FET, thereby protecting the rectifier circuit.

According to a bridge rectifier circuit of the present invention, when a voltage generated by the armature winding is causing a current to flow toward the battery through the bridge rectifier circuit, power loss in rectifying can be reduced, so that efficiency during generation control can be enhanced.

Moreover, when an abnormal overcurrent flows in the forward direction from the drain to the source of the FET, the FET is turned off to interrupt the overcurrent, so that the rectifier circuit can be protected from burnout due to the overcurrent.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, the embodiment of the present invention will be explained in detail referring to the accompanied drawings.

Embodiment 1

Figure 1:
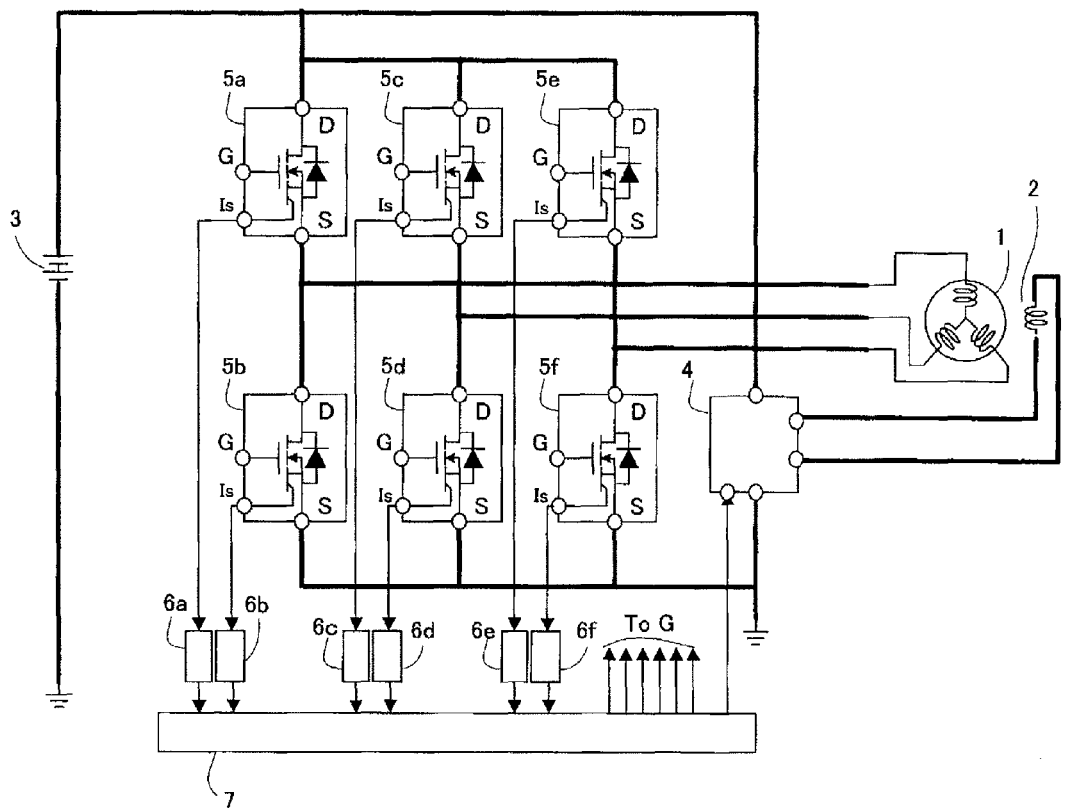
FIG. 1 is a diagram showing a configuration of the entire charging circuit using a bridge rectifier circuit according to Embodiment 1 of the present invention.

FIG. 1 is a diagram showing a configuration of the entire charging circuit using a bridge rectifier circuit according to Embodiment 1. In FIG. 1, the reference numeral 1 denotes an armature winding that constitutes a motor-generator; the reference numeral 2, a field winding of the same; the reference numeral 3, a vehicle-mounted battery; the reference numeral 4, a field-winding on/off switch that takes control of a current flowing through the field winding 2; and the reference numerals 5a to 5f, MOSFETs that are connected between the motor-generator and the battery 3 and constitute a rectifier circuit that takes control of a current flowing through the armature winding 1. In the figure, D represents a drain terminal; S, a source terminal; and G, a gate terminal. Furthermore, Is represents a terminal from which a current flowing between the drain and the source of one of the FETs, generally referred to as sensing FET or the like, is divided and taken out, which serves as a phase current detection terminal.

The reference numerals 6a to 6f denote phase current detection means that detect currents flowing through the FETs 5a to 5f and their directions; and the reference numeral 7, a pre-driver circuit serving as a control means that takes control of the gates of the FETs 5a to 5f and the field-winding current on/off switch 4.

Here, the phase current detection terminal Is is connected to each of the phase current detection means 6a to 6f, by which the amount and the direction of current are determined.

Figure 2:
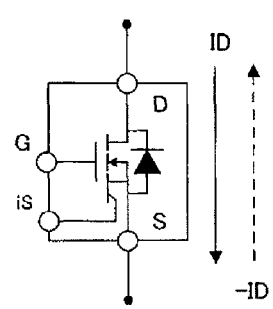
FIG. 2 is an explanatory diagram showing directions of a current flowing through an FET included in the bridge rectifier circuit according to Embodiment 1.

FIG. 2 is an explanatory diagram showing as an example one of the FETs 5a to 5f, in which ID and –ID represent their respective currents and directions flowing through the FET. ID represents a forward current flowing from the drain D to the source S, whose direction is represented by the solid line arrow, whereas –ID, a reverse current flowing from the source S to the drain D, whose direction is represented by the dashed line arrow.

Figure 3:
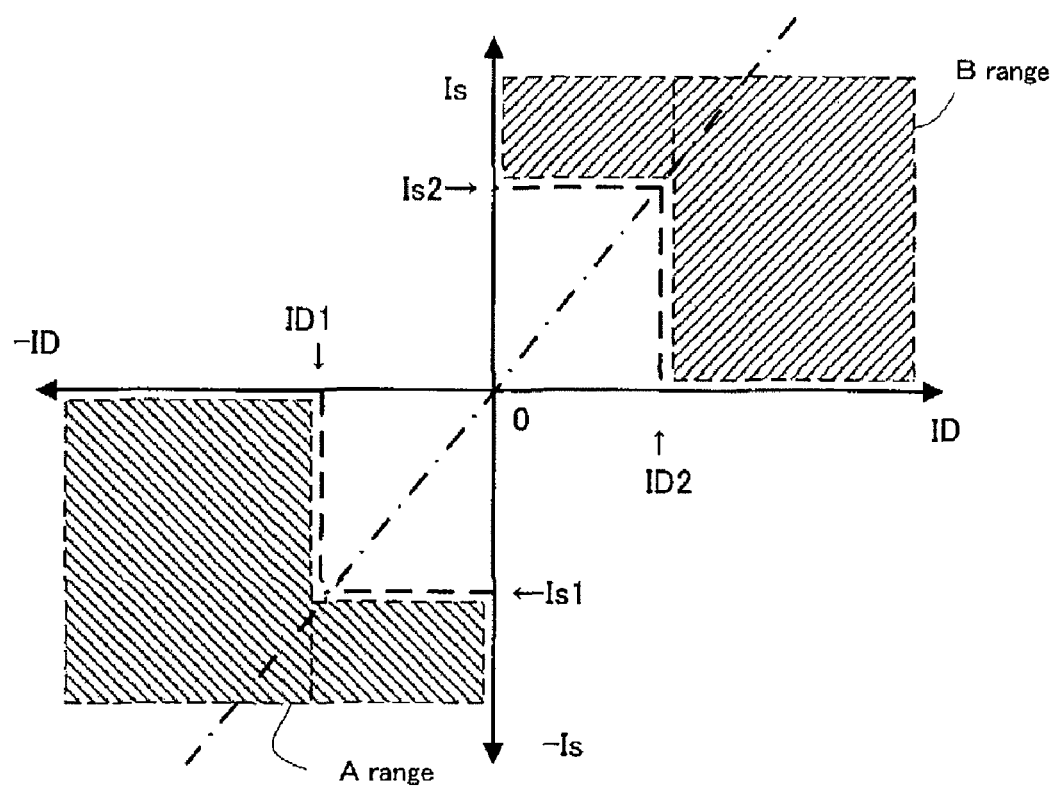
FIG. 3 is an ID-Is graph showing a relationship between the direction of current ID flowing through the FET and its detected current Is.

FIG. 3 is an ID-Is graph showing a relationship between the direction of the current ID flowing through one of the FETs 5a to 5f and an output at the phase current detection terminal Is that outputs part of the current ID.

When a current flows through the FET in the direction from the drain D to the source S thereof, that is, in the forward direction ID, a positive output is produced at the phase current detection terminal Is. Meanwhile, when a current flows through the FET in the direction from the source S to the drain D thereof, that is, in the reverse direction –ID, a negative output of –Is is produced at the phase current detection terminal Is.

The operation of the bridge rectifier circuit will be explained next.

In FIG. 3, if a current in a range exceeding a first predetermined value ID1 (shown as Range A in the figure) flowing in the direction –ID (reverse direction) is detected as Is1 by the phase current detection means 6, from the output at the phase current detection terminal Is, the rectifier circuit determines that the motor-generator is in generation mode of the armature winding 1; therefore, the pre-driver circuit 7 applies an on-signal to the gate of the FET so as to turn on the FET. Thereby, the FET operation is switched into low-resistance rectifying mode of the FET being in the on-state, from rectifying mode only by a parasitic diode formed in the FET in the direction of the source S to the drain D thereof, thereby reducing power loss.

Meanwhile, in FIG. 3, if a current in a range exceeding a second predetermined value ID2 (shown as Range B in the figure) in the direction ID (forward direction) is detected as Is2 by the phase current detection means 6, from the output at the phase current detection terminal Is, the rectifier circuit determines that the motor-generator is in an overcurrent state due to a failure; the pre-driver circuit 7 therefore applies an off-signal to the gate of the FET so as to turn off the FET. Thereby, the forward current through the FET is interrupted, so that the FET, other FETs constituting the bride rectifier circuit and their peripheral circuits can be protected from burnout due to an overcurrent.

As described above, in a synchronous generator or a synchronous motor-generator that has an armature and a field winding and serves as a starter-motor when starting the combustion engine as well as a generator after the engine start, a bridge rectifier circuit according to the present invention includes MOSFETs and phase current detection means that detect the amount and the direction of current flowing between the drain and the source of each MOSFET, whereby determination of the current is made, so that the FETs in the rectifier circuit are turned on or off in a controlled manner depending on the determination. Therefore, according to the bridge rectifier circuit of Embodiment 1 of the invention, if a reverse current exceeding the first predetermined value flows through one of the FETs, the rectifier circuit determines that the motor-generator is in the generation mode, a control voltage is applied between the gate and the source thereof, and then the FET is turned on, so that power loss in rectifying can be reduced. Meanwhile, if a forward current exceeding the second predetermined value flows through the FET, the rectifier circuit determines that it is in the overcurrent state, the control voltage being applied between the gate and the source of the FET is stopped, and then the FET is turned off to interrupt an overcurrent flowing therethrough, so that the bride rectifier circuit can be protected from burnout caused by the overcurrent. That is, this will enable a low-cost light and compact rectifier circuit to be provided that has functions of both enhancing efficiency in controlling generation and protecting itself from abnormal high currents.

Various modifications and alterations of this invention will be apparent to those skilled in the art without departing from the scope and spirit of this invention, and it should be understood that this is not limited to the illustrative embodiments set forth herein.

What is claimed is:

1. A bridge rectifier circuit electrically connected between a battery and a motor-generator having an armature winding and a field winding, for taking control of a current flowing through the armature winding and the battery, the bridge rectifier circuit comprising:
    a plurality of rectifier elements respectively comprising MOSFETs;
    phase current detection means for detecting the amount and the direction of current flowing between a drain and a source of the respective MOSFETs; and
    control means for controlling on/off states of the MOSFETs by applying a control voltage between a gate and the source of the respective MOSFETs, wherein when the phase current detection means detects a reverse current, flowing through one of the MOSFETs, exceeding a first predetermined value, the control means applies the control voltage between the gate and the source of the one MOSFET to turn on the one MOSFET, wherein in response to the phase current detection means detecting that the reverse current exceeds the first predetermined value, the control means determines that the motor-generator is in a generation mode, and in response to determining that the motor-generator is in the generation mode, the control means applies the control voltage as an on-signal to the gate of the one MOSFET to switch operation of the one MOSFET into a low-resistance rectifying mode by rectifying via a parasitic diode disposed in the one MOSFET in the direction of the source to the drain of the one MOSFET to thereby reduce power loss.

2. A bridge rectifier circuit according to claim 1, wherein when the phase current detection means detect a forward current, flowing through the one MOSFET, exceeding a second predetermined value, the control means stops the control voltage being applied between the gate and the source of the one MOSFET to turn off the one MOSFET, so that the rectifier circuit can be protected.

* * * * *